United States Patent
Keller

(10) Patent No.: US 9,573,855 B2
(45) Date of Patent: Feb. 21, 2017

(54) IN SITU PRODUCTION OF FERTILIZER

(71) Applicant: Russell J. Keller, Wake Forrest, NC (US)

(72) Inventor: Russell J. Keller, Wake Forrest, NC (US)

( * ) Notice: Subject to any disclaimer, the term of this patent is extended or adjusted under 35 U.S.C. 154(b) by 133 days.

(21) Appl. No.: 14/585,040

(22) Filed: Dec. 29, 2014

(65) Prior Publication Data

US 2015/0113870 A1   Apr. 30, 2015

Related U.S. Application Data

(63) Continuation of application No. 13/472,349, filed on May 15, 2012, now Pat. No. 8,951,481.

(60) Provisional application No. 61/490,186, filed on May 26, 2011.

(51) Int. Cl.
| | |
|---|---|
| B01J 19/08 | (2006.01) |
| B01J 19/12 | (2006.01) |
| H05H 1/00 | (2006.01) |
| C01B 13/11 | (2006.01) |
| C05C 5/00 | (2006.01) |
| A01G 7/00 | (2006.01) |
| H05H 1/48 | (2006.01) |

(52) U.S. Cl.
CPC . *C05C 5/00* (2013.01); *A01G 7/00* (2013.01); *B01J 19/088* (2013.01); *C01B 13/11* (2013.01); *B01J 2219/0849* (2013.01); *B01J 2219/0883* (2013.01); *C01B 2201/14* (2013.01); *H05H 2001/485* (2013.01)

(58) Field of Classification Search
CPC .............................. B01J 19/088; C01B 13/11
USPC ............ 422/186.04, 186.21, 186.07, 186.15; 204/179; 96/80
See application file for complete search history.

(56) References Cited

U.S. PATENT DOCUMENTS 4,915,915 A   4/1990   Treharne

*Primary Examiner* — Robert A Hopkins

(57) ABSTRACT

A system for creating a nitrate combined with a liquid. A corona discharge cell to generate an electrical field. The corona discharge cell further comprising a conduit to pass air through the electrical field to produce nitric oxide NO, wherein the air comprises a mixture of at least nitrogen $N_2$ and oxygen $O_2$, the conduit for combining the nitric oxide NO with the oxygen $O_2$ to form nitrogen dioxide $NO_2$. The corona discharge cell further comprising an injector for combining the nitrogen dioxide $NO_2$ with the liquid to generate nitric acid $HNO_3$ which combines with the liquid to generate the nitrate comprised of nitrate radical $NO_3$ mixed with the liquid.

20 Claims, 13 Drawing Sheets

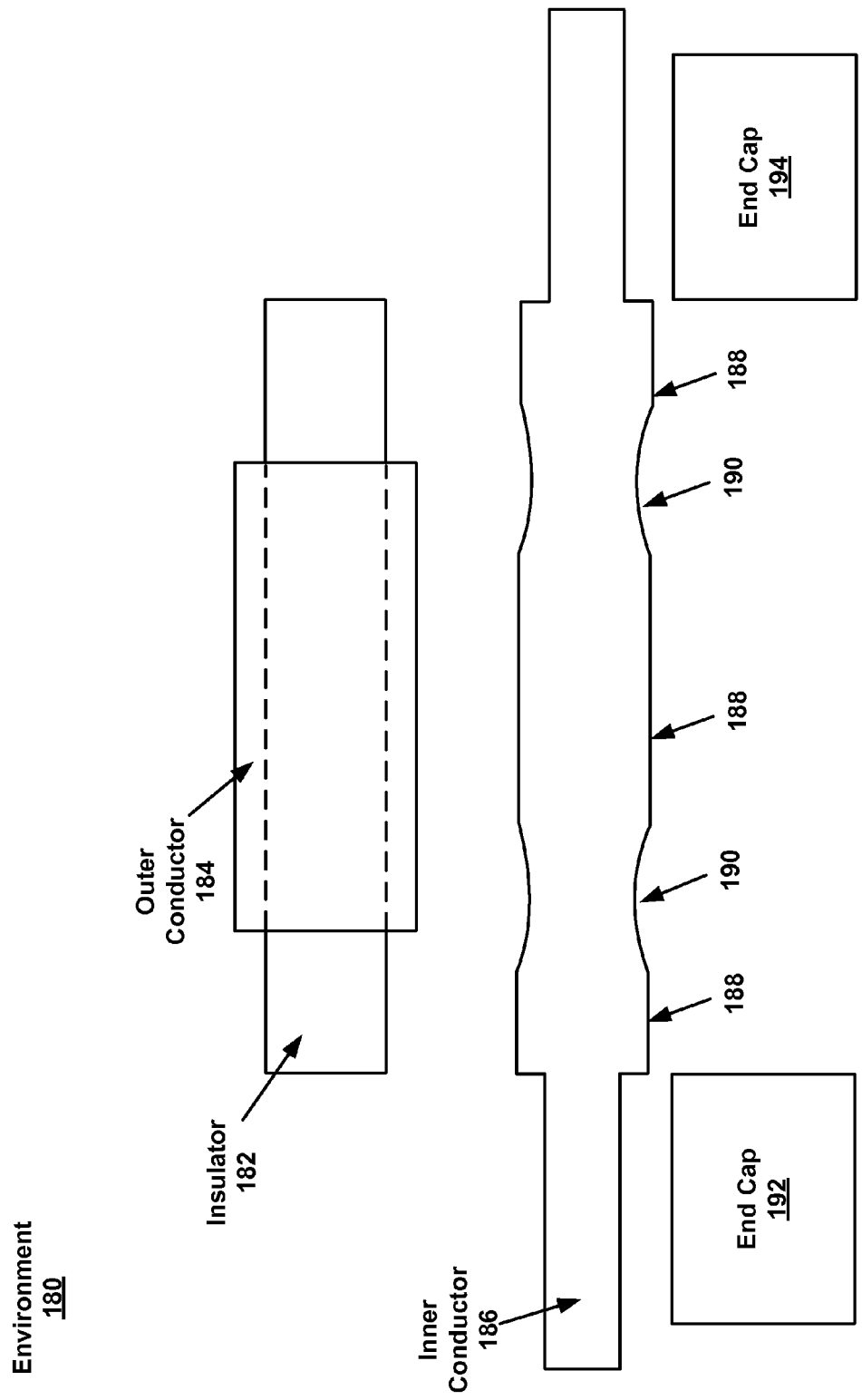

Environment
220

Process
600

AIR IS PASSED THROUGH A CORONA CELL TO PRODUCE NITRIC OXIDE NO, WHEREIN THE AIR COMPRISES A MIXTURE OF AT LEAST NITROGEN $N_2$ AND OXYGEN $O_2$
602

THE NITRIC OXIDE NO IS COMBINED WITH THE OXYGEN $O_2$ IN A CONDUIT TO FORM NITROGEN DIOXIDE $NO_2$
604

THE NITROGEN DIOXIDE $NO_2$ IS INJECTED INTO A LIQUID TO GENERATE NITRIC ACID $HNO_3$ WHICH COMBINES WITH THE LIQUID TO GENERATE A NITRATE RADICAL $NO_3$ MIXED WITH THE LIQUID
606

THE NITRATE RADICAL $NO_3$ MIXED WITH THE LIQUID ARE PROVIDED FOR FERTILIZATION AND WATERING
608

THE LIQUID MIXED WITH THE NITRATE RADICAL $NO_3$ IS DISTRIBUTED TO A CROP
610

FIGURE 6

Process
700

```
┌─────────────────────────────────────────────────────────────────┐
│ AIR IS PASSED THROUGH A CAVITY, WHEREIN THE AIR COMPRISES A     │
│ MIXTURE OF AT LEAST NITROGEN N₂ AND OXYGEN O₂                   │
│ 702                                                             │
└─────────────────────────────────────────────────────────────────┘
                                 │
                                 ▼
┌─────────────────────────────────────────────────────────────────┐
│ THE GASEOUS NITROGEN N₂ AND OXYGEN O₂ ARE EXPOSED TO            │
│ MICROWAVES FROM A MICROWAVE GENERATOR IN THE CAVITY TO          │
│ PRODUCE NITRIC OXIDE NO.                                        │
│ 704                                                             │
└─────────────────────────────────────────────────────────────────┘
                                 │
                                 ▼
┌─────────────────────────────────────────────────────────────────┐
│ THE NITRIC OXIDE NO IS COMBINED WITH THE OXYGEN O₂ IN A MIXING  │
│ CHAMBER TO FORM NITROGEN DIOXIDE NO₂.                           │
│ 706                                                             │
└─────────────────────────────────────────────────────────────────┘
                                 │
                                 ▼
┌─────────────────────────────────────────────────────────────────┐
│ THE NITROGEN DIOXIDE NO₂ IS INJECTED INTO A LIQUID TO GENERATE  │
│ NITRIC ACID HNO₃ WHICH COMBINES WITH THE LIQUID TO GENERATE THE │
│ FERTILIZED COMPRISED OF A NITRATE RADICAL NO₃ MIXED WITH THE    │
│ LIQUID.                                                         │
│ 708                                                             │
└─────────────────────────────────────────────────────────────────┘
                                 │
                                 ▼
┌─────────────────────────────────────────────────────────────────┐
│ THE NITRATE RADICAL NO₃ MIXED WITH THE LIQUID ARE PROVIDED FOR  │
│ FERTILIZATION AND WATERING                                      │
│ 710                                                             │
└─────────────────────────────────────────────────────────────────┘
```

FIGURE 7

Process
900

```
┌─────────────────────────────────────────────────────────────────┐
│ NITRIC OXIDE NO IS GENERATED FROM AN AIR SOURCE COMPRISING A    │
│ GASEOUS NITROGEN $N_2$ AND OXYGEN $O_2$                         │
│ 902                                                              │
└─────────────────────────────────────────────────────────────────┘
                                │
                                ▼
┌─────────────────────────────────────────────────────────────────┐
│ THE NITRIC OXIDE NO IS COMBINED WITH THE OXYGEN $O_2$ IN A      │
│ CONDUIT TO FORM NITROGEN DIOXIDE $NO_2$                         │
│ 904                                                              │
└─────────────────────────────────────────────────────────────────┘
                                │
                                ▼
┌─────────────────────────────────────────────────────────────────┐
│ THE FERTILIZER IS MANUFACTURED BY INJECTING THE NITROGEN        │
│ DIOXIDE $NO_2$ INTO A LIQUID TO GENERATE NITRIC ACID $HNO_3$    │
│ WHICH COMBINES WITH THE LIQUID TO GENERATE A NITRATE            │
│ RADICAL $NO_3$                                                   │
│ 906                                                              │
└─────────────────────────────────────────────────────────────────┘
                                │
                                ▼
┌─────────────────────────────────────────────────────────────────┐
│ THE REVENUE EXPENDITURES ASSOCIATED WITH THE MANUFACTURING      │
│ THE FERTILIZER ARE REDUCED COMPARED TO CONVENTIONAL             │
│ MANUFACTURE PROCESSES FOR THE FERTILIZER BY REDUCING ENERGY     │
│ REQUIREMENTS ASSOCIATED WITH PRODUCING THE FERTILIZER AND BY    │
│ REDUCING TRANSPORTATION OF THE FERTILIZER FROM A SITE OF        │
│ PREPARATION TO AN AREA OF USE COMPARED TO THE CONVENTIONAL      │
│ MANUFACTURE PROCESSES                                            │
│ 908                                                              │
└─────────────────────────────────────────────────────────────────┘
                                │
                                ▼
┌─────────────────────────────────────────────────────────────────┐
│ THE NITRATE RADICAL $NO_3$ MIXED WITH THE LIQUID ARE PROVIDED   │
│ FOR FERTILIZATION AND WATERING                                  │
│ 910                                                              │
└─────────────────────────────────────────────────────────────────┘
                                │
                                ▼
┌─────────────────────────────────────────────────────────────────┐
│ AN ION OF A MATERIAL IS RELEASED TO COMBINE WITH THE LIQUID    │
│ 912                                                              │
└─────────────────────────────────────────────────────────────────┘
```

FIGURE 9

IN SITU PRODUCTION OF FERTILIZER

RELATED APPLICATIONS

This application claims priority to and is a continuation of the co-pending patent application Ser. No. 13/472,349, entitled "IN SITU PRODUCTION OF FERTILIZER," with filing date May 15, 2012, by Russell J. Keller, the disclosure of which is hereby incorporated herein by reference in its entirety.

The application with Ser. No. 13/472,349 claims priority to the then co-pending provisional patent application, Ser. No. 61/490,186, entitled "IN SITU NITRATE PRODUCTION AND DELIVERY SYSTEM," with filing date May 26, 2011. The application with Ser. No. 13/472,349 incorporated the Provisional Patent Application 61/490,186 in its entirety by reference.

BACKGROUND

Farming techniques often require the use of fertilizer for growing crops efficiently. Current methods utilize synthetic fertilizers made from non renewable fossil fuels. These methods are considered non-sustainable because the many added costs detracting from the overall farming produce equation. For example, the fertilizer must be manufactured, transported to the farm site, and then disbursed to the crops, each or which has costs and hazards associated with it. Some farming techniques result in fertilizers being overused with the excess fertilizer ending up in lakes, streams, rivers and oceans causing environmental problems. The key component of the nitrogen cycle, essential for plant growth is Nitrate or $NO_3$. Nitrate is needed for the plants to create amino acids, which are the basic building blocks proteins and of life.

BRIEF DESCRIPTION OF THE DRAWINGS

FIG. 1C illustrates a block diagram of components for producing fertilizer in situ in accordance with embodiments of the present technology.

FIG. 6 illustrates a flowchart of an example method for producing a fertilizer in accordance with embodiments of the present technology.

FIG. 7 illustrates a flowchart of an example method for producing a fertilizer in accordance with embodiments of the present technology.

FIG. 9 illustrates a flowchart of an example method for reducing revenue expenditures associated with an in situ production of a fertilizer in accordance with embodiments of the present technology.

Figure 1A:
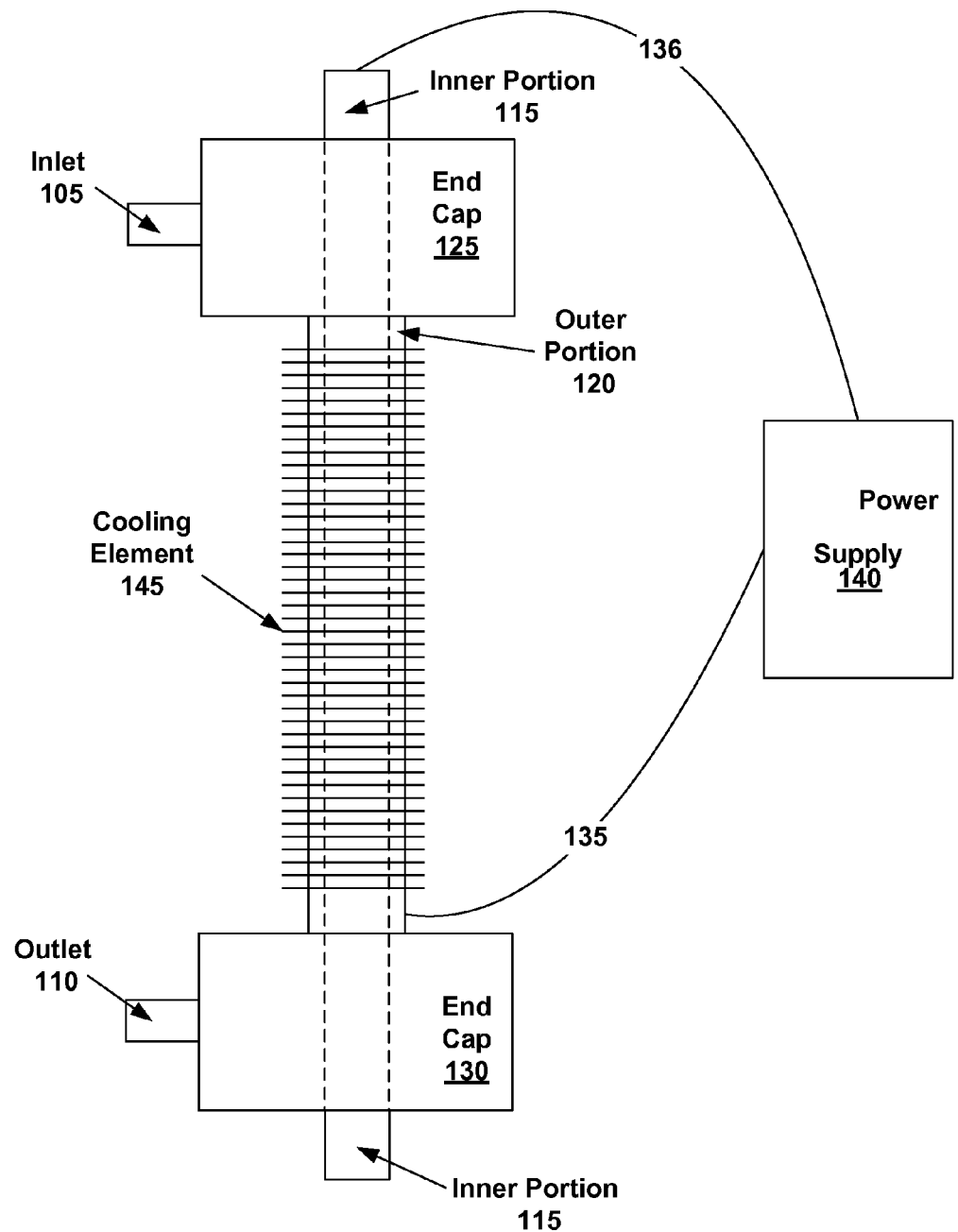
FIG. 1A illustrates a block diagram of components for producing fertilizer in situ in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Overview of In Situ Production of Fertilizer

Nitrogen, N on the periodic table, is found in nature as diatomic nitrogen $N_2$. The air we breathe is about 78 percent nitrogen, but is not in a molecular form suitable for plant growth. To make this nitrogen available to support life, nitrogen from the atmosphere must be converted into a molecule plants can metabolize. In one form this is called Nitrate or $NO_3$.

The present technology operates to generate or produce Nitrate as a fertilizer in situ or on location where fertilizer is needed for growing crops. The Nitrate may be injected into a water supply and is then delivered to the crops or plants by delivering the water injected with the Nitrate to the crops. A manifold may be used for the injecting the Nitrate into the water supply. A system may be implemented on location for generating Nitrate and then watering and fertilizing the crops simultaneously. Thus the present technology reduces costs associated with producing or manufacturing fertilizer off-site, transporting the fertilizer to a crop site, and deliver the fertilizer to the crops.

Often methods using a synthetic nitrogen fertilizer made from fossil fuels require time, effort and expense to transport the fertilizer to the crop site or farm and then distribute or deliver the synthetic nitrogen fertilizer to the crops often by means of a tractor or other farm equipment. Such techniques are inefficient and may result in over-fertilizing which causes the excess fertilizer to end up in natural water supplies. Such non-sustainable farming techniques are costly and create problems that need to be dealt with currently and more so in the future. The present technology produces fertilizer in situ thus eliminating the need to transport the fertilizer from an off-site location to a farm or crop site. The fertilizer is injected into a water supply that may be used to water or irrigate the crops thus eliminating the need to use tractors or other equipment to deliver the fertilizer to the crops. The two transport costs alone make the process attractive as an alternative to conventional fertilizer delivery methods. Additionally, delivering the Nitrate to crops using water reduces the practice of overusing fertilizer as the water enables faster nutrient uptake by the plant. Some modern farming techniques require the use of organic fertilizer. The present technology solves the need for transporting organic fertilizer to a crop location by producing organic fertilizer in situ.

The present technology converts nitrogen from its gaseous state in the air to a Nitrate form that is soluble in water. Such techniques may be more cost efficient than current techniques for producing fertilizer.

Nitrate ($NO_3$) is produced from atmospheric nitrogen ($N_2$) during lightning storms. The energy released by the lightning as well as the pressure and accompanying rain produce a natural fertilizer. The present technology described herein uses hardware and techniques to reproduce this process using air, electricity and water. The present technology may be described as creating a form of controlled lightning called electrical plasma. Using pre-determined electrical frequency, voltage and under the right pressure $N_2$ may be converted into $NO_3$ at a manageable scale.

In an embodiment, air comprising nitrogen, oxygen, and other gaseous elements, is passed through a corona discharge cell. The corona discharge cell is configured to create a high-voltage electrical field sufficient to ionize the nitrogen and oxygen molecules, reducing them to their elemental states. When forced into a water solution, the free radical elements recombine in various ways to form nitric acid in solution, with free radical $NO_3$, nitrate as a product of the nitric acid and water.

The gas plasma or corona can be produced at the corona cell's resonant frequency or a harmonic thereof, by a large difference of potential between two conductors, which may be separated by an insulator, with a space in between for the gas to travel through. As the gas travels through the plasma the $N_2$ molecules are ionized to the point where they can break apart into their base atoms and then recombine at a higher energy state or as a polyatomic radical with a $x^{-1}$ charge. The resultant high-energy nitrogen then forms $NO_3$ when injected into the water via a venturi system, or other method.

An embodiment using ambient air as the source for nitrogen ($N_2$) also includes approximately twenty percent oxygen content. With the oxygen, $HNO_3$ is produced which, when injected into $H_2O$, produces $NO_3$ or Nitrate. An embodiment using nitrogen alone creates $NO_3$ by an undefined but measurable process. The resultant liquid contains Nitrate, which can then be piped into an irrigation system for direct delivery to the crops during irrigation.

In one embodiment, air comprising nitrogen, oxygen, and other gaseous elements, is exposed to microwaves from a microwave generator. The microwave energy also produces an Alternating Current (AC) electrical-field sufficient to ionize the nitrogen and oxygen molecules, reducing them to their elemental states, just as an AC or Direct Current (DC) electrical-field does in the corona cell embodiment. When forced into a water solution, the free radical elements recombine in various ways to form nitric acid in solution, with free radical $NO_3$, nitrate as a byproduct. In various embodiments, the same result may be obtained using radio waves, such as high frequency high power radio waves other than those defined as microwaves, which may have the same or greater effect.

The following discussion will demonstrate various hardware, power supplies, and other components that are used with and in systems used for in situ production of fertilizer in various embodiments of the present technology.

Embodiments of In Situ Production of Fertilizer

With reference now to FIG. 1A, a corona cell in accordance with embodiments of the present technology. FIG. 1A depicts environment 100 which shows an embodiment of a corona cell connected to power supply 140. However, the present technology may be practiced with corona cells of different shapes and sizes that may or may not include the components shown in FIG. 1A.

The corona cell comprises an inner portion 115 and an outer portion 120 which are electrically conductive and may be described as electrodes or conductors. Inner portion 115 and outer portion 120 may be comprised of any number of materials that are electrically conductive such as metal, copper, silver, aluminum, stainless steel, etc. Inner portion 115 may be solid in shape or may be tubular with a hollow portion. In one embodiment, the length of inner portion 115 extends longer than outer portion 120 and through end caps 125 and 130. A conduit, chamber, or air gap is formed between inner portion 115 and outer portion 120 which is also enclosed on either end by end caps 125 and 130 and is air tight. In one embodiment, air-tight chamber is formed between an insulator, not shown in FIG. 1A, inner portion 115 and end caps 125 and 130. Outer portion 120 may then be wrapped around the insulator and need not extend the full length between end caps 125 and 130. Thus the chamber, conduit or air gap is formed in a tubular fashion with an annular ring chamber. The insulator may form the structural supporting body of the assembly.

Power supply 140 may be employed to connect, an electrical voltage to inner portion 115 and outer portion 120 via wires 135 and 136. It should be appreciated that power supply 140 may supply a voltage to either inner portion 115 or outer portion 120 and connect the other to ground. Alternatively, neither polarity need be connected to ground, but rather can be independent of the grounding system. When voltage is applied to inner portion 115 or outer portion 120, an electrical field is generated in the chamber between the two. By shaping inner portion 115 and outer portion 120 in a cylindrical, annular fashion, the volume of the enclosed chamber exposed to the electrical field is maximized and makes efficient use of the voltage applied by power supply 140 to generate the electric field. An electric field is equal to voltage divided by distance. Thus the shorter the distance the greater the electric field strength will be. In one embodiment, the distance or thickness of the air gap between inner portion 115 and the outer conductor is 0.02 inches. In one embodiment, power supply 140 is powered by solar cells. In one embodiment a minimum voltage level is required for ionization in the corona cell. This minimum voltage may be referred to as called the corona inception voltage (CIV). In one embodiment, the minimum AC voltage required is 1.950 KV RMS or 2.75 KV peak to peak to cross an air gap of 0.01 inches. In such an embodiment, a higher level of voltage may also be employed.

In one embodiment, outer portion 120 may be a thin material that is electrically conductive and able to wrap or bend around the insulator. For example the insulator may be a glass tube which provides structural rigidity and support. A thin sheet of metal or copper plating may be adhesively applied to the outer surface of the insulator. The cooling of outer portion 120 may be aided by cooling elements 145. In one embodiment, cooling elements 145 are composed of thin metal or other material that will thermally cool outer portion 120. Cooling elements 145 may be made with a single wire-wound spring that is then wrapped around outer portion 120. Alternatively, cooling fins may be affixed to the outer surface. The fins may be arranged to be in parallel with the axis of the corona cell, or may be formed as annular rings whose planes are perpendicular to the axis of the corona cell. In one embodiment, inner portion 115 has a diameter of 0.56 inches, the insulator in annular and has an inner diameter of 0.6 inches and an outer diameter of 0.68 inches, thus creating a 0.02 inch air gap between the inner diameter of the insulator and inner portion 115. In such an embodiment, air may flow through the annular air gap in the range of 4 to 12 liters per minute or 8.47 to 25.4 standard cubic foot per hour (SCFH). In one embodiment, the distance between the outer surface of inner portion 115 and out portion 120 is 0.19 inches.

In one embodiment, inner portion 115 is hollow and filled with air which is used to cool inner portion 115 which will become hot as inner portion 115 is heated by the close proximity of the hot plasma. Air may be forced through the hollow portion of inner portion 115 via a fan or other means to increase the cooling effect. In one embodiment, inner portion 115 and outer portion 120 may be described as coaxial cylinders.

The wires connecting the power supply high voltage to the two conductors on the corona cell body may be connected by any of well-known methods. A solder tab may be attached to outer portion 120 as an electrical connector for power supply 140. The power supply wire may use a terminal clip that is used to connect or disconnect wire 135 to outer portion 120 via a solder tab. The placement of the solder tab/terminal clip may be at any point along the outer portion 120. Inner portion 115 may be connected to power supply 115 via wire 136 connected in a similar manner. Soldering may be preferable as a more permanent connection method. It should be appreciated that current or voltage from power supply 140 may be direct current or alternating current. Thus the electrical field orientation between inner portion 115 and outer portion 120 may point in either direction in operations of the present technology.

In one embodiment, end cap 125 comprises inlet 105 which allows air or gas to flow into the chamber subjected to the electric field. The air or gas may be ambient air, filtered air, or from a supply such as a tank. End cap 130 comprises outlet 110 which allows gases to flow out of the chamber. It should be appreciated that the corona cell is not directional meaning that the gas inlets and outlets may be switched and the corona cell would operate in the same manner. Inlet 105 and outlet 110 may have standard connectors for connecting hoses or other hardware used to transport gases. End caps 125 and 130 may be comprises of a variety of materials to make the chamber air-tight by holding the inner portion 115 away from the insulator or outer portion 120. In one embodiment, end caps 125 and 130 are composed of Teflon or ceramic and employ Kalrez™ or flourosilicone o-rings for end cap seals. In one embodiment, inlet 105 utilizes Viton seals and o-rings. In one embodiment, inlet 105 and outlet 110 utilizes polyvinylidene fluoride (PVDF) or stainless steel fittings. The corona cell may also employ a variety of seals, o-rings, nuts, bolts, adhesives, and other hardware to hold the components together while forming an air tight chamber. In one embodiment, the ends of inner portion 115 are threaded such that a nut may be used to secure the end caps to the corona cell and allows the chamber to be pressurized. In one embodiment, the insulator is composed of glass such as borosilicate glass, well-known for its excellent thermal stability. In one embodiment, the gas mixture from the corona cell passes out of the cell and is injected into a liquid using an injector such as a venturi injector or an air stone. An air stone is a porous rock-like substance with multiple interconnecting passages which facilitate intermixing of the gas and the liquid.

In one embodiment, the corona cell is used to generate nitrogen dioxide $NO_2$ which is injected into a liquid, comprising water $H_2O$, to generate nitric acid $HNO_3$ which combines again with the liquid to generate a nitrate radical $NO_3$. Thus, a nitrate fertilizer is generated or manufactured. The corona cell operates by passing air into the chamber which is exposed to an electrical field generated between inner portion 115 and 120. The air exposed to the electric field in the chamber ionizes the nitrogen into a gas plasma or corona. Ambient air comprises a mixture of nitrogen $N_2$ and oxygen $O_2$ as well as other gases. The nitrogen $N_2$ exposed to the electrical field produces nitric oxide NO in the chamber. The nitric oxide NO then combines with the $O_2$ in the chamber to generate the nitrogen dioxide $NO_2$. This may be described as the Haber process or Haber-Bosch process. The present technology may also may use of the Birkeland-Eyde Reaction. The present technology may also be connected to a manifold or other system that is employed to simultaneously water and fertilize crops.

Crops, such as oats, grass and soybeans that have been fertilized and watered with embodiments of the present technology have demonstrated positive impacts on both the green mass as well as the root mass of the plant.

Aerobic bacteria are naturally found in soil and are often starved for oxygen because of soil compaction and other factors. If the soil becomes void of enough oxygen, anaerobic bacteria take over and can actually remove nitrogen from the soil and release it into the atmosphere which prevents the crops from absorbing the nitrogen. The present technology presents a solution for minimizing the effects of loss of oxygen in the soil. The corona cell also introduces oxygen $O_2$ into the water which is then delivered to the crops and their surrounding soil. The oxygen $O_2$ provides aerobic bacteria with a higher level of oxygen. Thus the aerobic bacteria are not able to remove the nitrogen from the soil the crops are growing in.

Air passing through the corona cell may be controlled via a variety of parameter with a variety of techniques. In one embodiment, the pressure of the gas and/or plasma is controlled. Such control may be implemented using a circuit. The circuit may comprise a process and a circuit board that may or may not be part of power supply 140. The circuit may also comprise components that measure the temperature of the corona cell. In one embodiment, the frequency of the corona cell may be controlled for various reasons. For example, the frequency may be changed on start-up of the corona cell to tune a circuit. The circuit it tuned to achieve a resonance which is determined by measuring the voltage and current. A map may be created that maps the voltage and current as it applies to a corona cell which can be used to precisely determine on which frequency the resonance is located. Resonance and resonant frequency may be used for frequency control to power cells of different shapes and sizes as well as compensating for changes due to thermal expansion and contraction. Such compensation may be achieved in real time while the corona cell is active.

Maintaining or controlling a corona cell at or near its resonant frequency allows uses less power and generates less heat while producing a maximized corona compared to a corona cell that is not controlled. In one embodiment, the frequency circuit of the corona cell is first tuned to be in resonance, and then the corona cell is de-tuned as the power supply's frequency is moved off resonance slightly to reduce the corona level. The de-tuning may be performed to a point where there is still a strong plasma in the corona cell but the temperature is reduced. In one embodiment, this balance between the strength of the plasma and the temperature is a specified percentage or otherwise predetermined and programmed into the circuit. The processor on the circuit board may constantly monitor the corona cell and then make adjustment due to environmental changes and/or cell changes during the life span of the cell.

In one embodiment, the current of power supply 140 is controlled. A current sensor and limiting circuit are utilized on a microprocessor controlled power supply to: limit current to the corona cell to a preset level, limit current to the corona cell on start-up to extend cell life, and remove current if a high current condition is sensed. Different size and shape corona cells need different amounts of current to achieve corona.

In one embodiment, the voltage of power supply 140 is controlled. Voltage control may be achieved by means of changing the voltage applied to the primary coil of the output or step-up transformer to supply the difference of potential across the air gap and insulator to achieve the desired corona. In one embodiment the power supply comprises voltage settings from 6,000 to 12,000 voltage in alternating current (VAC) root mean square (rms). In one embodiment, the voltage is set for each cell size and type to a fixed value and the frequency is controlled while the voltage is fixed.

In one embodiment, the temperature of the corona cell is controlled. A temperature of the corona cell is measured. For example, a thermistor may be affixed to end cap 125 or 130 or other non-conductive area. The thermistor may detect radiate heat and can warn of potential problems. The circuit reads the resistance of the thermistor and compares it to a set value. If the reading goes off the set value then the circuit can be de-tuned farther away from the set resonant frequency which lowers the gas plasma level in the cell in to cool it down. Corona cells may be used in a variety of environmental conditions which may vary in environmental temperature, humidity, etc. By monitoring the corona cell temperature, the corona cell may be kept active and producing corona a level appropriate to the environmental temperature. For example, in a warm green house, the corona cell may run at a lower activity level during the day and a higher activity level during the night. In one embodiment, the circuit board for the corona cell or power supply comprises an output to indicate temperature such as a light emitting diode (LED) output.

Temperature may also be controlled by controlling the amount of time a power supply is run. For example, a power supply may be turned on and off in a cycle such as a duty cycle. A duty cycle timer may be employed to turn the power supply on for one second and then off for one second, or for any other predetermined durations of time from 0 to 100%. Duty cycles for power supplies might have millisecond on off times such as on for 9 milliseconds, off for 1 milliseconds for a 90% duty cycle; or comparably, on for 900 milliseconds and off for 100 milliseconds with the same net corona and heat effect.

In one embodiment, the control parameters or features of the corona cell that control frequency, resonant frequency, voltage, current, pressure and/or temperature, are monitored and controlled remotely. This may be accomplished with a power supply comprising the components and ability to communicate over a network. For example, a power supply may communicate via RS 485 to a ModBus or SCATA network. Power supplies and corona cells can also be controlled in a master-slave configuration. This is accomplished via a jumper on the circuit board as that is used to set one power supply as the master and jumpers on other circuit boards set as slaves. For example, one master can monitor and control twenty slaves via a three wire serial data cable. A telephone cable and plug in connectors may be used for this application.

In one embodiment, the voltage applied to the corona cell is from alternating current a frequency of the electrical field of the corona cell is controlled. In one embodiment, the voltage from the power source to the corona cell is controlled. In one embodiment, the electrical current from the power source to corona cell is controlled. In one embodiment alternating current or AC power is used to create the gas plasma in the corona cell. In one embodiment direct current or DC power is used to create the gas plasma in the corona cell. In one embodiment the power source may use AC power to power the systems power supply. In one embodiment the power source may be a DC supply, such as a solar cell or battery, to power the systems power supply. In one embodiment, the corona cell is indirectly controlled by measuring a temperature of the corona cell via a thermistor. The data from the thermistor is then employed to operate the corona cell at a predetermined or optimal temperature.

In one embodiment, inner portion 115 is composed of copper and as a result of the heat from the corona and the strong electric field created by the high voltage, cause copper ions to be ejected from the copper conductor. Thus this corona cell introduces copper ions into the water, which then act as a fungicide for the crops. Crops treated with copper ions using embodiments of the present technology have demonstrated a positive impact in germination rates and vigor of the plant. In one embodiment, inner portion 115 is composed of iron and as a result of the heat and strong electric field created by the corona, cause iron ions to be ejected from the iron conductor and introduced into the gas entering the water. In similar fashion other beneficial conductive metals can be used, singularly or as an amalgamation, for the center conductor allowing their ions to be released by the same effect.

In one embodiment, a corona cell may be employed to inject a water supply with nitrate. The same water may then be injected with more nitrate fertilizer by a different corona cell or a microwave generator by passing the same water through the system. Either additional corona cells may be used to add nitrate to the water, or the water can be re-circulated. In so doing, the same water becomes more and more saturated with nitrate fertilizer. This technique may be employed to ensure that a desired or proper amount of nitrate fertilizer is delivered to the crop. Henry's Law of physics states that at a constant temperature, the amount of a given gas that dissolves in a given type and volume of liquid is directly proportional to the partial pressure of that gas in equilibrium with that liquid. In one embodiment, Henry's Law creates an upper limit of how much nitrate fertilizer may be dissolved into the same water. To overcome this limitation, excess nitrogen may be removed from the water to allow the nitrate fertilizer to saturate the water. A degasser may be employed to remove the excess nitrogen from the water prior to injection of the nitrate.

In one embodiment, a corona cell and a delivery system may be portable and used to deploy nitrate fertilizer directly to a crop or plant. For example, the corona cell and delivery system may be mounted to a tractor and then transported to a plurality of crops at different locations to fertilizer and water the crops on location. A corona cell and a delivery system may also be stationary and connected to a water source employed at a farm for irrigating crops.

Figure 1B:
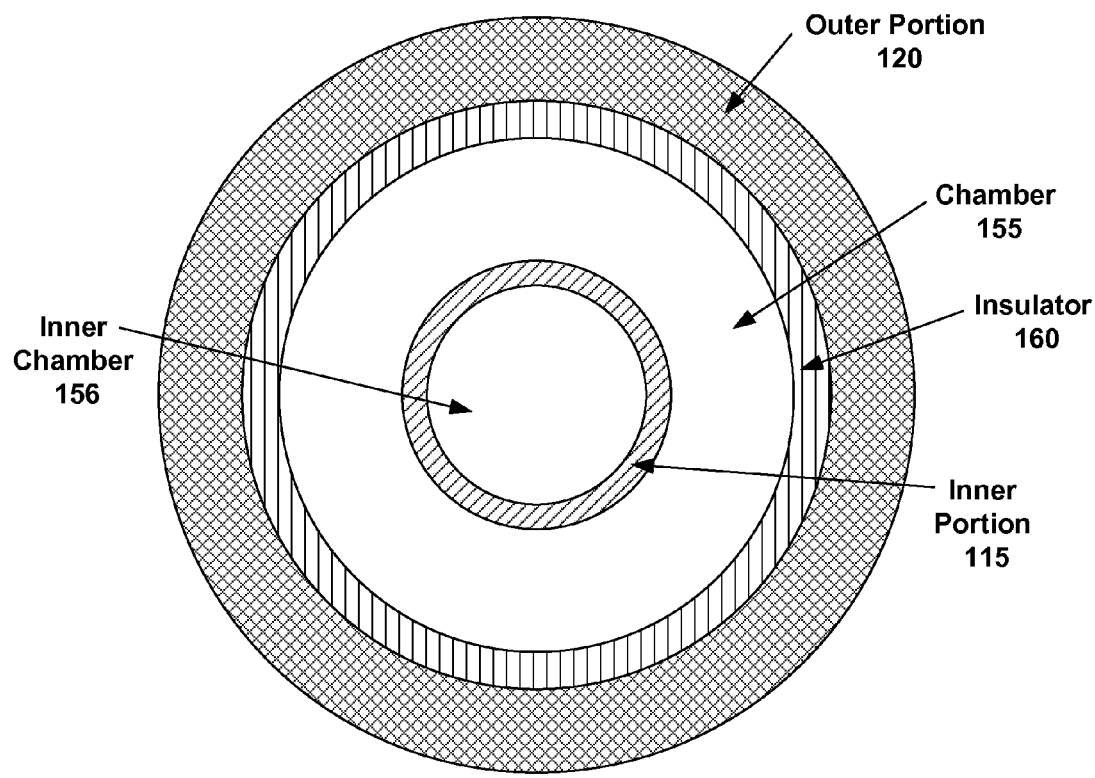
FIG. 1B illustrates a block diagram of components for producing fertilizer in situ in accordance with embodiments of the present technology.

With reference now to FIG. 1B, a cross sectional view of a corona cell in accordance with embodiments of the present technology. FIG. 1B depicts environment 170 which shows an embodiment of a corona cell. However, the present technology may be practiced with corona cells of different shapes and sizes that may or may not include the components shown in FIG. 1B. It should be appreciated that outer portion 120 and inner portion 115 of FIG. 1A may have the same features, capabilities and properties as outer portion 120 and inner portion 115 of FIG. 1B. It should be appreciated that relative distances, proportions, and thickness of components depicted in environment 170 may vary in practice.

Environment 170 depicts insulator 160 as separating inner portion 115 and outer portion 120 such that chamber 155 is formed. Chamber 155 may be the chamber, conduit or air gap described in FIG. 1A. Insulator 160 may be the insulator described in FIG. 1A. Air or other gases are passed through chamber 155 and exposed to an electrical field generated between outer portion 120 and inner portion 115. The thickness of chamber 155 may vary in different portions of the corona cell. Inner chamber 156 may be a hollow portion of inner portion 115 that allow ambient air to pass through the corona cell thus cooling inner chamber 115 and the corona cell as a whole.

With reference now to FIG. 1C, an exploded view of a corona cell in accordance with embodiments of the present technology. FIG. 1C depicts environment 180 which shows an embodiment of a corona cell. However, the present technology may be practiced with corona cells of different shapes and sizes that may or may not include the components shown in FIG. 1C. It should be appreciated that outer portion 120, inner portion 115, and end caps 125 and 130 of FIG. 1A may have the same features, capabilities and properties as outer conductor 184, inner conductor 186, and end caps 192 and 194 respectively. Insulator 182 may be the insulator described in FIG. 1A.

In one embodiment, outer conductor 184 is 4.5 inches long and is centered on insulator 182 which is 7 inches long. A terminal clip may be placed a third of the way down on outer conductor 184 which is 2.75 inches from an edge of insulator 182. The terminal connector may also be placed at any point along the outer conductor 184. Insulator 182 may be formed with an outer diameter of 0.75 inches and an inner diameter of 0.60 inches. Inner conductor 186 may be 10 inches long with two threaded portions 1.1 inches long each on either end of inner conductor 186. The non-threaded portion of inner conductor 186 is 7.8 inches and is centered between the threaded portions. In one embodiment, the inner diameter of inner conductor 186 is 0.315 inches and the outer diameter of inner conductor 186 is 0.56 inches. In one embodiment, the air gap between insulator 182 and inner conductor 186 may be variable depending on pressure, frequency, voltage, temperature, gas type, etc.

In one embodiment, outer conductor 184 is shorter in length than inner conductor 186. The corona or gas plasma generated in the chamber then concentrates near the edges of the shorter outer conductor 184. Such a concentration may lead to insulator 182 burning out near the concentration faster than the rest of insulator 182. One design adjustment to reduce this potential burnout is to vary the air gap or chamber near the edges of the shorter outer conductor 184. By creating more distance between inner conductor 186 and outer conductor 184 near the edges of the shorter outer conductor 184 the strength of the electric field is diminished. The diminished electric field leads to a lower concentration of corona or gas plasma at the edges of the shorter outer conductor 184 and thus the insulator 182 does not burn out as quickly. In one embodiment, the air gap is varied by tapering the diameter of inner conductor 186 at the edges of outer conductor 184. For example, 190 depicts a more narrow diameter of inner conductor 186 at the two edges of outer conductor 184 while 188 depicts a thicker diameter of inner conductor 186. Such tapering of inner conductor 186 may accomplished by machining techniques. In one embodiment, the air gap created by 188 of inner conductor 186 is 0.04 inches and the air gap created by 190 of inner conductor 186 is 0.05. In one embodiment, 190 of inner conductor 186 is centered 2.7 inches from an edge of inner conductor 186. It should be appreciated that FIG. 1C is not drawn to scale.

Figure 2A:
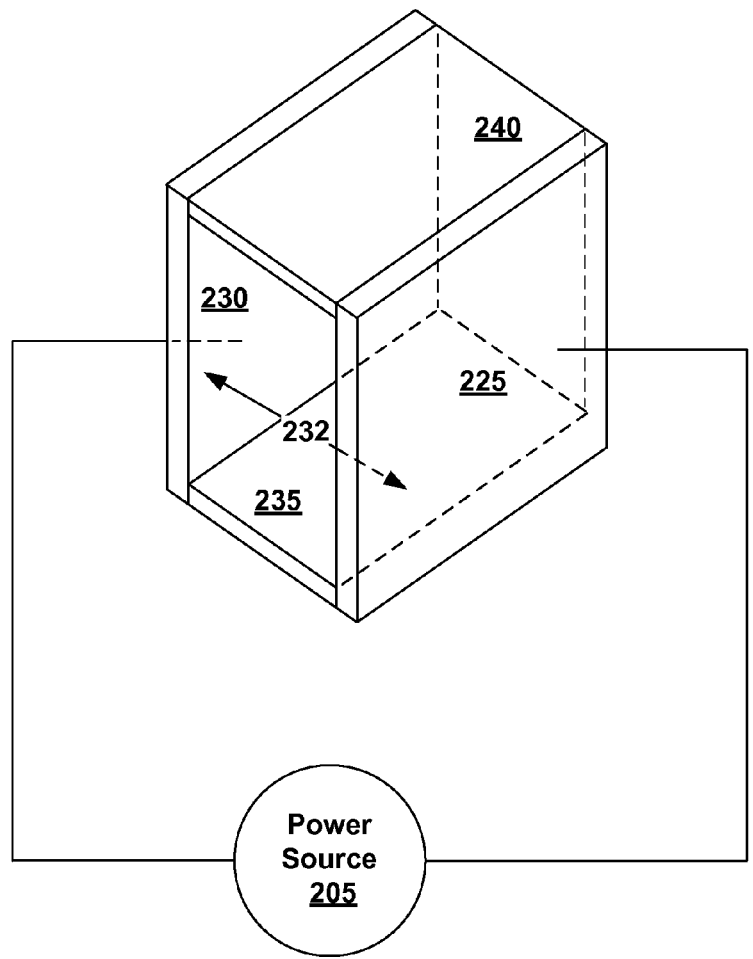
FIG. 2A illustrates a block diagram of components for producing fertilizer in situ in accordance with embodiments of the present technology.

With reference now to FIG. 2A, a corona cell in accordance with embodiments of the present technology is shown. FIG. 2A depicts environment 220 which shows an embodiment of a corona cell. Environment 220 depicts plates 225 and 230 which are electrically conductive and may be described as electrodes or conductors. Plates 225 and 230 are connected to power source 205 and electricity, current, frequency or voltage is applied. It should be appreciated that a frequency of 0 Hertz denotes a DC voltage with no alternating polarity. Plates 225 and 230 are separated by an air gap such that power source 205 generates an electric field 232 between the plates. The direction of electric field 232 is based on the polarity of power source 205. It should be appreciated that plates 225 and 230 are depicted as being square in shape but may be any number of shapes such as triangular, circular, rectangular, star shaped, etc. Plates 225 and 230 are coupled to one another by plates 235 and 240. In one embodiment, plates 225, 230, 235 and 240 form an enclosure, chamber or tunnel open on either end which allows air to be passed through. Plates 235 and 240 do not electrically connect plates 225 and 230. In one embodiment, plates 235 and 240 are not required and the present technology is practiced simply with plates 225 and 230.

Air, such as ambient air or filtered air comprising nitrogen $N_2$ and oxygen $O_2$, passes through the enclosure, chamber, or tunnel. The nitrogen $N_2$ exposed to the electrical field produces nitric oxide NO. The nitric oxide NO then combines with the $O_2$ to generate nitrogen dioxide $NO_2$. The nitrogen dioxide $NO_2$ is injected into a liquid, comprising water $H_2O$, to generate nitric acid $HNO_3$ which combines again with the liquid to generate a nitrate radical $NO_3$. Thus, a nitrate fertilizer is produced.

Figure 2B:
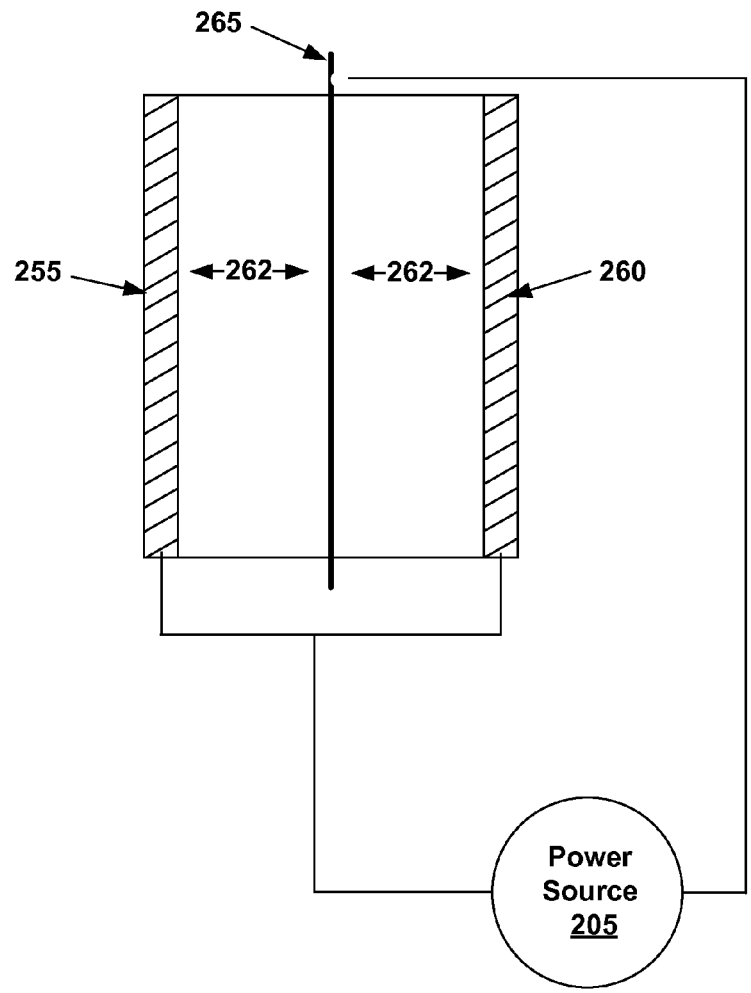
FIG. 2B illustrates a block diagram of components for producing fertilizer in situ in accordance with embodiments of the present technology.

With reference now to FIG. 2B, a cross section view of a corona cell in accordance with embodiments of the present technology. FIG. 2B depicts environment 250 which shows an embodiment of a corona cell. Environment 250 depicts wire 265 and plates 255 and 260 which are electrically conductive and may be described as electrodes or conductors. Wire 265 and plates 255 and 260 are connected to power source 205 and electricity, current or voltage is applied. Wire 265 is separated from plates 255 and 260 by two air gaps such that power source 205 generates two different electric fields 262 between the plates. The direction of electric fields 262 is based on the polarity of power source 205. In one embodiment, plates 255 and 260 are part of the same tubular pipe surrounding wire 265.

Figure 2C:
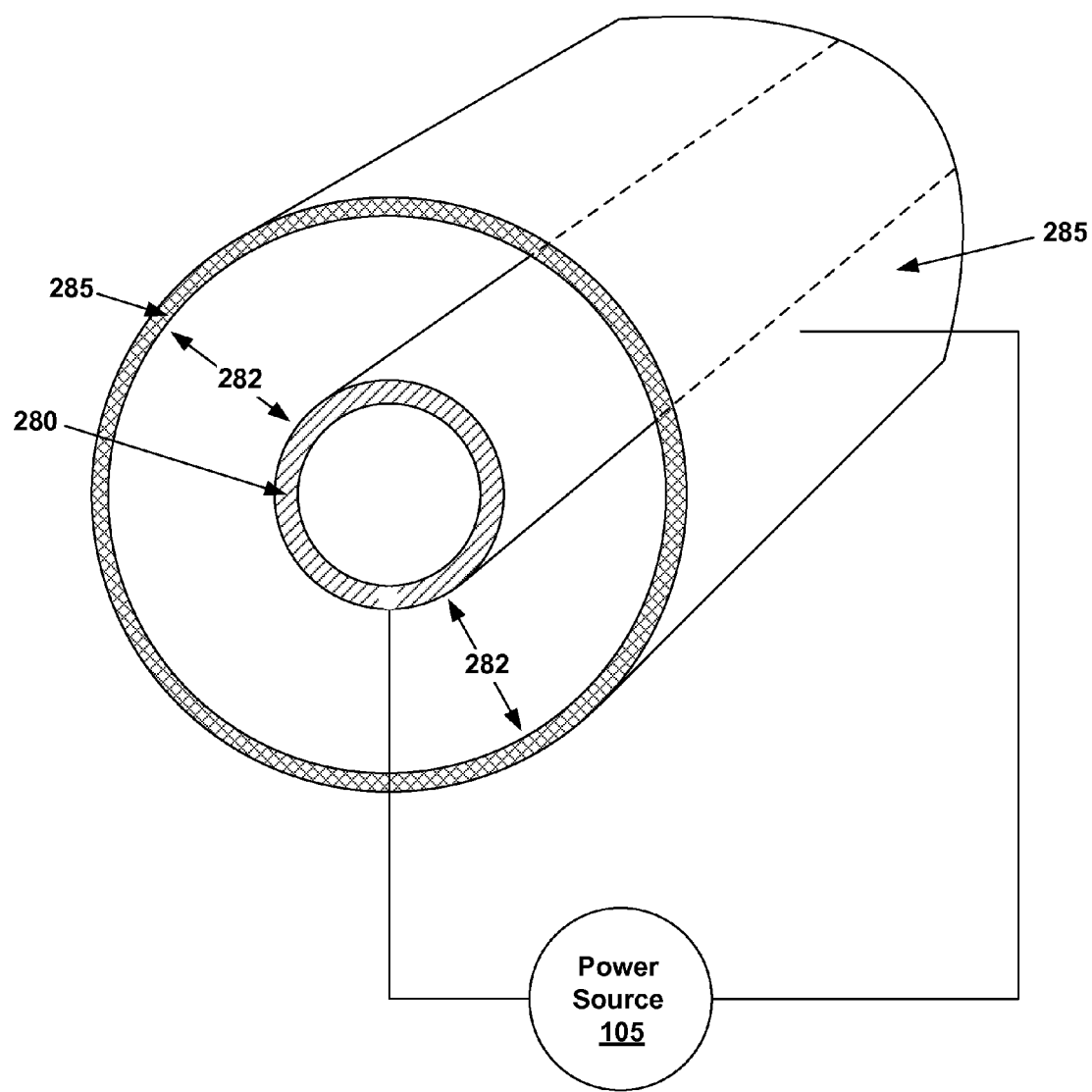
FIG. 2C illustrates a block diagram of components for producing fertilizer in situ in accordance with embodiments of the present technology.

With reference now to FIG. 2C, a corona cell in accordance with embodiments of the present technology. FIG. 2C depicts environment 275 which shows an embodiment of a corona cell. Environment 275 depicts tubes 280 and 285 which are electrically conductive and may be described as electrodes or conductors. Tubes 280 and 285 are connected to power source 205 and electricity, current or voltage is applied. Tubes 280 and 285 are separated by a tubular air gap such that power source 205 generates an electric field 282 between the plates. Electric field 282 radiates in a radial direction. The direction of electric field 232 is based on the polarity of power source 205. It should be appreciated that tubes 280 and 285 are depicted as being cylindrical pipes in shape but may be pipes of any number of shapes such as triangular, square, rectangular, star shaped, etc. In one embodiment, tubes 280 and 285 form an enclosure, chamber or tunnel open on either end which allows air to be passed through.

Air, such as ambient air or filtered air comprising nitrogen $N_2$ and oxygen $O_2$, passes through the enclosure, chamber, or tunnel. The nitrogen $N_2$ exposed to the electrical field produces nitric oxide NO. The nitric oxide NO then combines with the $O_2$ to generate nitrogen dioxide $NO_2$. The nitrogen dioxide $NO_2$ is injected into a liquid, comprising water $H_2O$, to generate nitric acid $HNO_3$ which combines again with the liquid to generate a nitrate radical $NO_3$. Thus, a nitrate fertilizer is produced.

Figure 3:
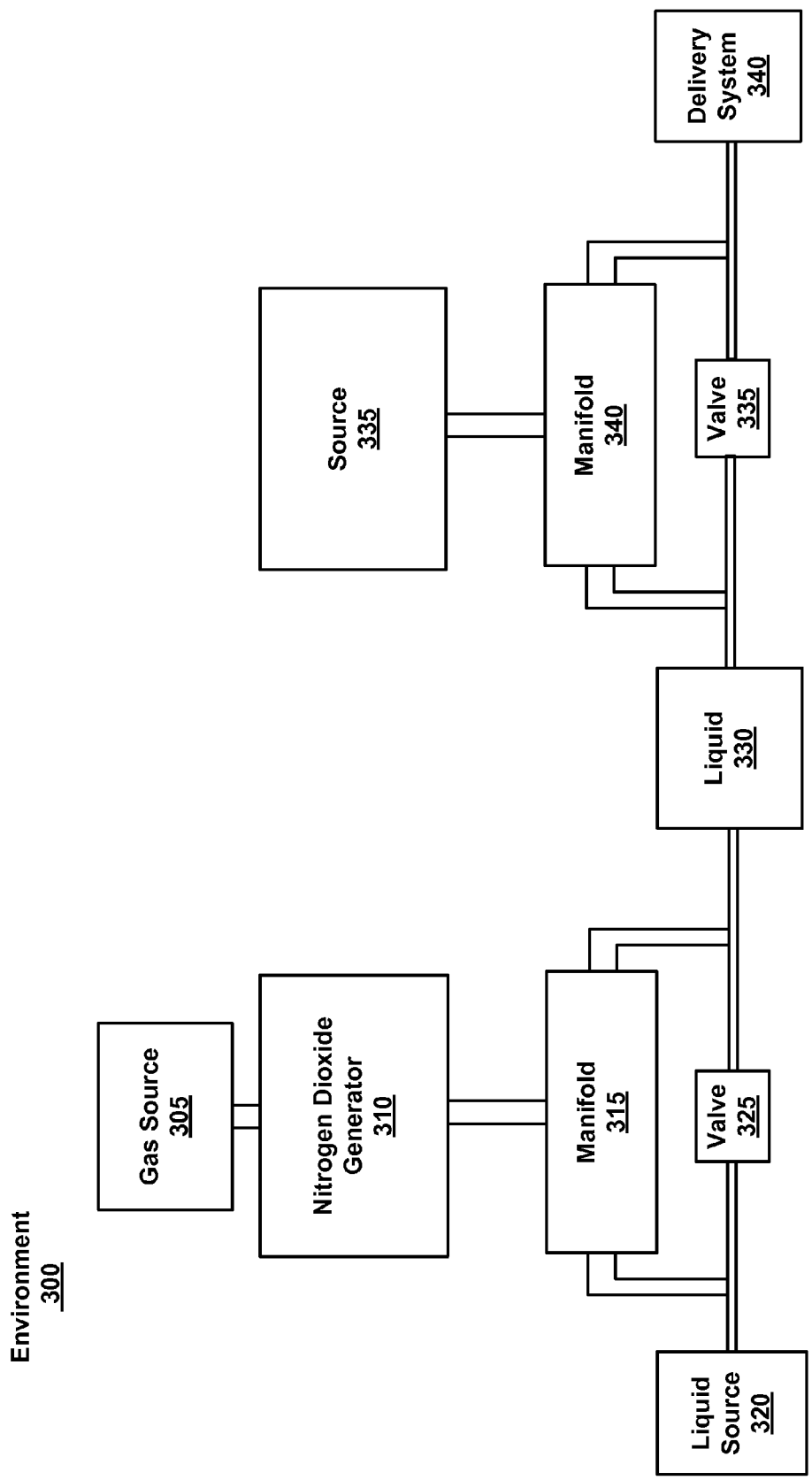
FIG. 3 illustrates a block diagram of components for producing fertilizer in situ in accordance with embodiments of the present technology.

With reference now to FIG. 3, a block diagram of components for producing fertilizer in situ in accordance with embodiments of the present technology. FIG. 3 depicts environment 300 comprising nitrogen dioxide generator 310 and source 335 connected with manifolds 315 and 340 respectively. Manifolds 315 and 340 may inject gases into a liquid using an injector such as a venturi injector or may use an air stone.

In one embodiment, nitrogen dioxide generator 310 and source 335 are both corona cells connected in series or parallel to the same water source. nitrogen generator 310 receives ambient air, filtered air, or other gases from gas source 305, generates nitrogen dioxide which is injected into liquid source 320 via manifold 315 controlled by valve 325. Liquid 330 then comprises nitrate fertilizer. This same process is then repeated using source 335, which is a corona cell in this example, manifold 340 controlled by valve 335 to inject more nitrogen dioxide into liquid 330 such that liquid 330 is outputted by manifold 340 with more nitrate fertilizer in it. In other words, a plurality of corona cells are employed to inject nitrogen dioxide into the same water over and over to build up higher concentrations of nitrate fertilizer in the water. The water and nitrate fertilizer may then be delivered to crops simultaneously by delivery system 340.

In one embodiment, nitrogen dioxide generator 310 and source 335 are both microwave generators connected in series or parallel to the same water source. Microwave generators are further discussed in FIG. 5.

In one embodiment, source 335 is employed to with manifold 340 to introduce other chemicals, liquids, gases, fungicides, pesticides, etc. to the liquid that has been injected with nitrate fertilizer. In other words, the present technology may be employed with a pre-existing or other fertigation system. For example, in addition to nitrogen, plants also require potassium and phosphorus as nutrients. Source 335 may comprise potassium or phosphorus. Source 335 may be in-line before or after nitrogen dioxide generator 310.

Figure 4:
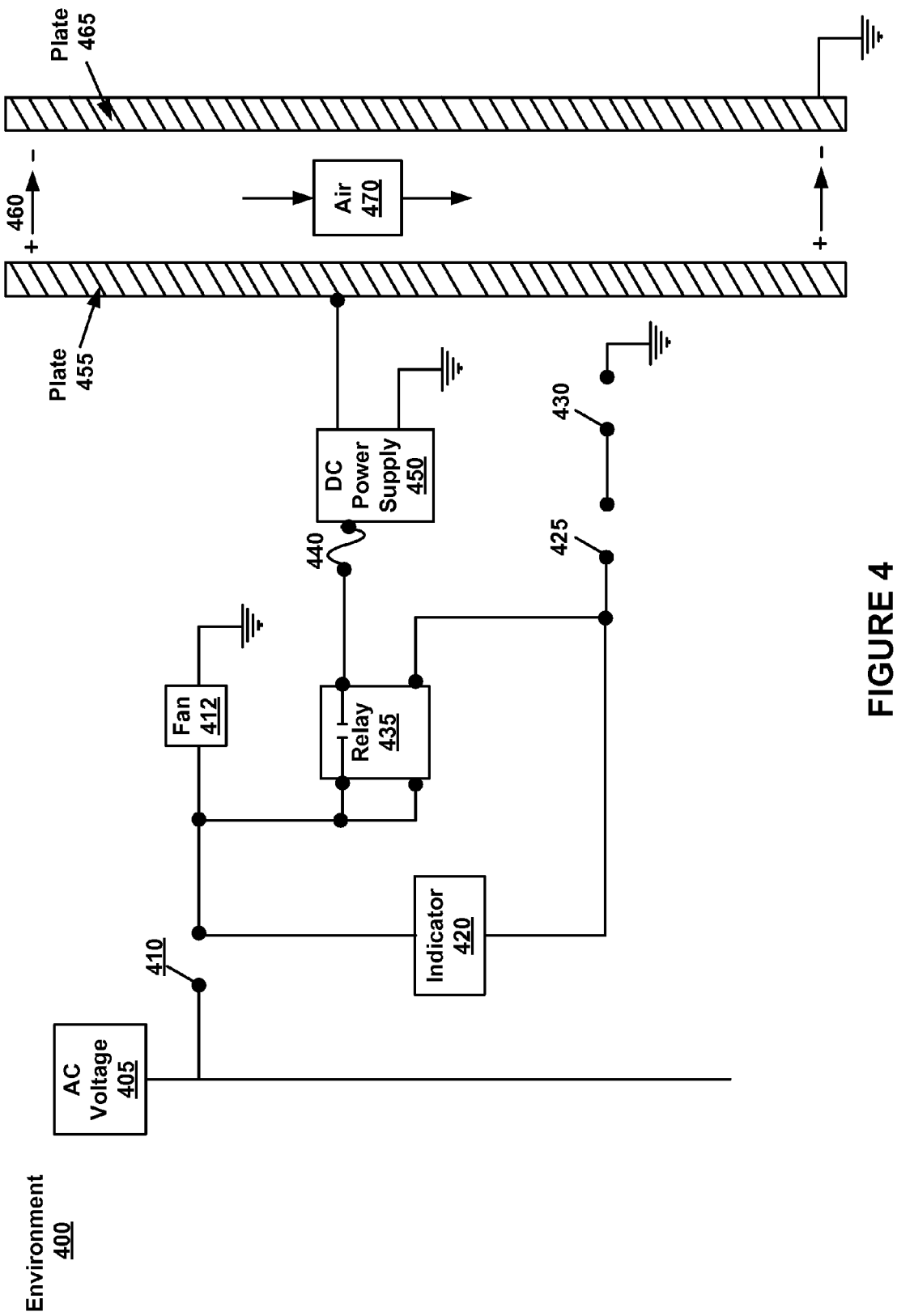
FIG. 4 illustrates a block diagram of components for producing fertilizer in situ in accordance with embodiments of the present technology.

With reference now to FIG. 4, a circuit diagram of a power source in accordance with embodiments of the present technology. FIG. 4 depicts environment 400 comprising a power source connected to plates 455 and 465. The power source draws power from AC voltage 405 and converts the alternating current (AC) to direct current (DC) at DC power supply 450. The power source comprises switches 410, 425, and 430, relay 435, and fuse 440. Fan 412 is employed to cool the power source and is connected to ground. Indicator 420 indicates when the power source is running and may be a light such as a light emitting diode. DC power supply 450 depicted as connected to plate 455 and to ground. Plate 465 is connected to ground. Voltage is applied to plate 455 and generates electric field 460 across an air gap between plates 455 and 465. Air 470 is then passed through the air gap in accordance with techniques of the present technology. Electric field 460 may change direction based on the polarity of DC power supply 450. In one embodiment, DC power supply 450 may instead be an AC power supply that operates the corona cell between 20-50 kilohertz.

In one embodiment, the power source for the corona cell (450 FIG. 4) is a switching power supply that operates at a frequency that is well above frequencies associated with human hearing. Thus the power source will not have an audible whine. For example, the operating frequency may have a range of 30,000 to 60,000 Hertz with 40,000 Hertz as nominal.

Figure 5:
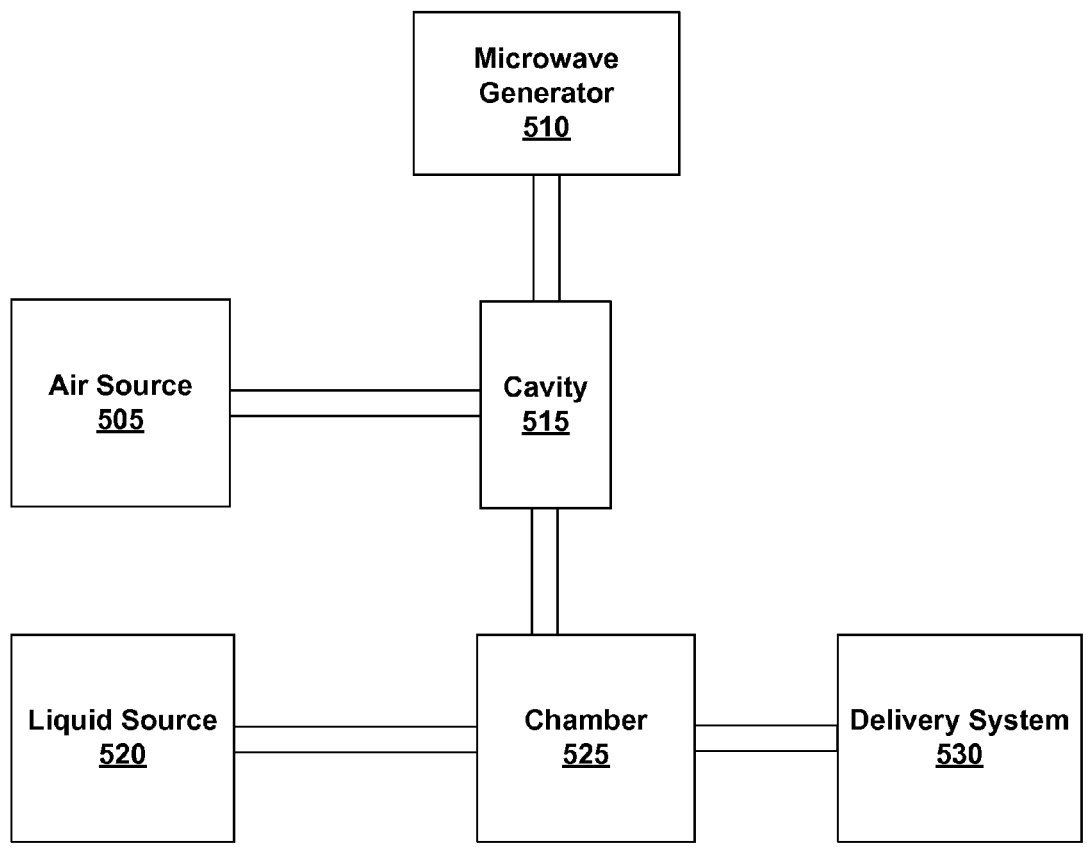
FIG. 5 illustrates a block diagram of components for producing fertilizer in situ in accordance with embodiments of the present technology.

With reference now to FIG. 5, a block diagram of a system for generating nitrates in accordance with embodiments of the present technology. FIG. 5 depicts environment 500 comprising microwave generator 510. Microwave generator 510 may be used with cavity 515 to act as a corona cell to manufacture nitrate fertilizer in a water source in accordance with the present technology. This embodiment is like the example in FIG. 2A, but all the walls are conductors, as in the heating portion of a microwave oven. It should be appreciated that the present technology may employ both corona cells and microwave generators to produce nitrate fertilizer in the same water source.

In one embodiment, air source 505 comprises air or other gases that comprise nitrogen $N_2$ and oxygen $O_2$ which may be from ambient air or filtered air. The air flows to cavity 515 where it is exposed to microwaves from microwave generator 510. The microwaves generated by microwave generator 510 may be described as microwave energy which produces an AC electrical-field and may be any frequency where microwaves are suitable for ionization of the nitrogen $N_2$ and oxygen $O_2$. For example, the microwave energy might be generated at a frequency of 2.54 GHz. The nitrogen $N_2$ exposed to the microwaves produces nitric oxide NO in cavity 515. The nitric oxide NO then combines with the $O_2$ in cavity 515 to generate nitrogen dioxide $NO_2$. The nitrogen dioxide $NO_2$ is injected into a liquid from liquid source 520, comprising water $H_2O$, in chamber 525 to generate nitric acid $HNO_3$ which combines again with the liquid in chamber 525 to generate a nitrate radical $NO_3$. Thus, a nitrate fertilizer is generated or manufactured. The water and nitrate fertilizer is then delivered to the crops via delivery system 530. Chamber 525 could be a container fed by injecting the $NO_2$ from cavity 515 into the mix via injector, air stone, bubble tubing, or other distribution methods like a centrifuge used for mixing.

Operations

With reference now to FIG. 6, a flowchart of process 600 for producing a fertilizer in accordance with embodiments of the present technology. It should be appreciated that process 600 may be carried out with some or all of the steps described and not necessarily in the in order described. Process 600 may be carried out using the systems and components described in FIGS. 1A-C, 2A-C, 3 and 4. It should be appreciated that the present technology may operate process 600 in a plurality of instances occurring simultaneously, in series, or in parallel. In addition, process 600 may be operated in conjunction with other processes such as processes 700, 800, or 900.

At 602, air is passed through a corona cell to produce nitric oxide NO, wherein the air comprises a mixture of at least nitrogen $N_2$ and oxygen $O_2$. The air may be ambient air and may be filtered or may be from a source such as a tank.

At 604, the nitric oxide NO is combined with the oxygen $O_2$ in a conduit to form nitrogen dioxide $NO_2$. Air passing through the corona cell may be controlled using a variety of parameters, features, and techniques. In one embodiment, the pressure of the gas and/or plasma is controlled. In one embodiment, a frequency of the electrical field of the corona cell is controlled. In one embodiment, a voltage of the power source for the corona cell is controlled. In one embodiment, alternating a current of power for the corona cell is controlled. In one embodiment, a resonant frequency of the corona cell is controlled. In one embodiment, a temperature of the corona cell is controlled. In one embodiment a current of the power supply is controlled.

At 606, the nitrogen dioxide $NO_2$ is injected into a liquid to generate nitric acid $HNO_3$ which combines with the liquid to generate a nitrate radical $NO_3$ mixed with the liquid. In one embodiment, the liquid is water. The liquid may also comprise ozone, a pesticide, potassium, phosphorus, or a fungicide element such as a copper ion. The copper or other metal ion may be release from a copper or other metal electrode in the corona cell. The gases produced by the corona cell may be injected into the water source using injectors such as venture injectors associated with a manifold or may be injected via an air stone to create bubbles in the liquid. In one embodiment, the method is repeated using a plurality of corona cells and conduits connected in series and parallel. In one embodiment, the same liquid is injected with nitrogen dioxide more than once to increase the amount of nitrate in the liquid.

At 608, the nitrate radical $NO_3$ mixed with the liquid are provided for fertilization and watering of a crop. For example, a farm may have irrigation or other water systems in place to water the crops, the corona cell and other components may be connected to this water system for delivery of the nitrate fertilizer.

At 610, the liquid mixed with the nitrate radical $NO_3$ is distributed to a crop.

With reference now to FIG. 7, a flowchart of process 700 for producing a fertilizer in accordance with embodiments of the present technology. It should be appreciated that process 700 may be carried out with some or all of the steps described and not necessarily in the in order described. Process 700 may be carried out using the systems and components described in FIGS. 3 and 5. It should be appreciated that the present technology may operate process 700 in a plurality of instances occurring simultaneously, in series, or in parallel. In addition, process 700 may be operated in conjunction with other processes such as processes 600, 800, or 900.

At 702, air is passed through a cavity, wherein the air comprises a mixture of at least nitrogen $N_2$ and oxygen $O_2$.

At 704, the gaseous nitrogen $N_2$ and oxygen $O_2$ are exposed to microwaves from a microwave generator in the cavity to produce nitric oxide NO. In one embodiment, the microwave generator may be replaced by a generator or oscillator emitting high energy radio frequencies outside of the microwave frequency band that can cause the breakdown of the nitrogen $N_2$ molecule.

At 706, the nitric oxide NO is combined with the oxygen $O_2$ in a mixing chamber to form nitrogen dioxide $NO_2$.

At 708, the nitrogen dioxide $NO_2$ is injected into a liquid to generate nitric acid $HNO_3$ which combines with the liquid to generate the fertilized comprised of a nitrate radical $NO_3$ mixed with the liquid. In one embodiment, the liquid is water. The liquid may also comprise ozone, a pesticide, potassium, phosphorus, or a fungicide element such as a copper ion.

At 710, the nitrate radical $NO_3$ mixed with the liquid are provided for fertilization and watering of a crop.

Figure 8:
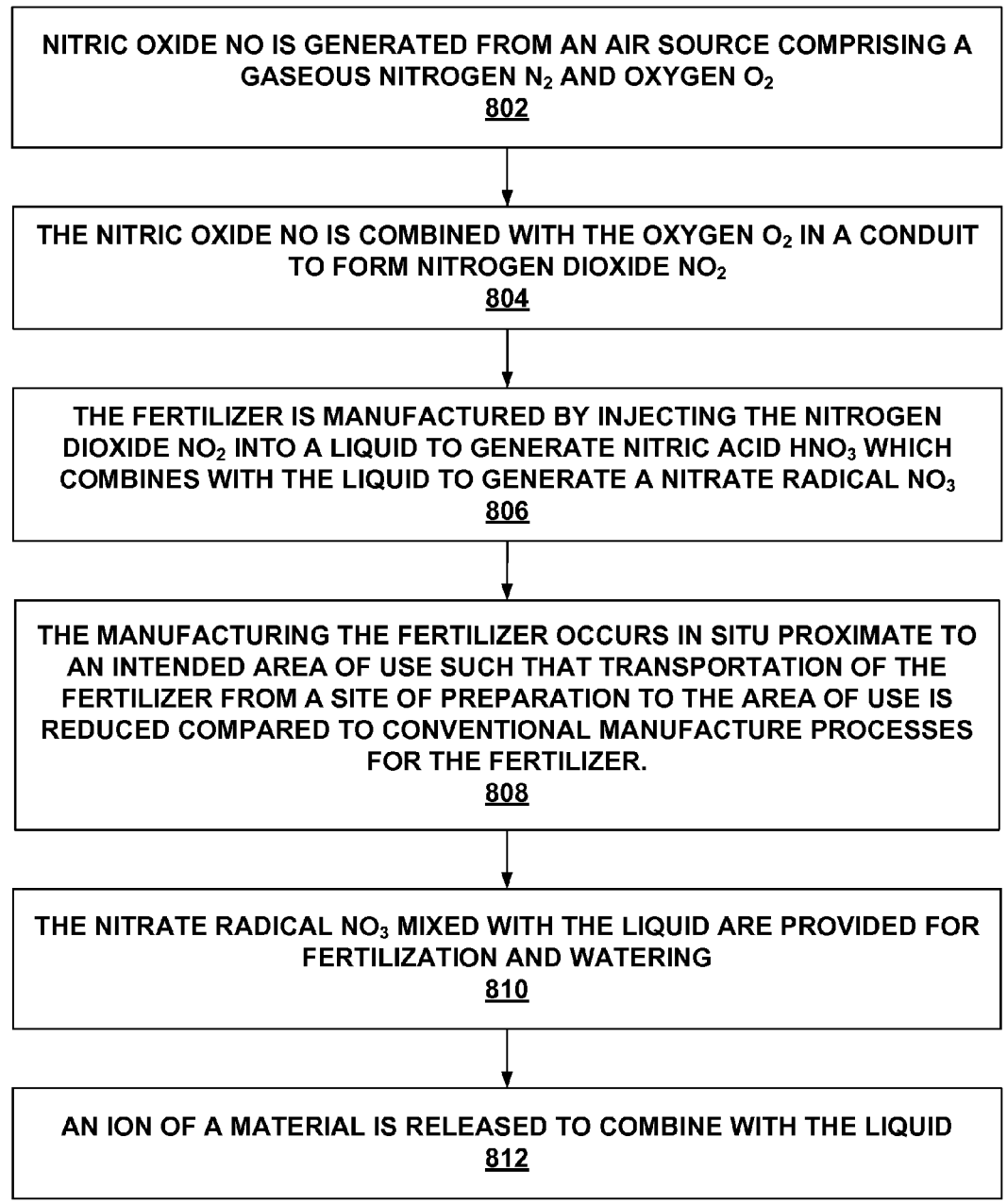
FIG. 8 illustrates a flowchart of an example method for in situ production of a fertilizer in accordance with embodiments of the present technology.

With reference now to FIG. 8, a flowchart of process 800 for in situ production of a fertilizer in accordance with embodiments of the present technology. It should be appreciated that process 800 may be carried out with some or all of the steps described and not necessarily in the in order described. Process 800 may be carried out using the systems and components described in FIGS. 1A-C, 2A-C, 3, 4, and 5. It should be appreciated that the present technology may operate process 800 in a plurality of instances occurring simultaneously, in series, or in parallel. In addition, process 800 may be operated in conjunction with other processes such as processes 600, 700, or 900.

At 802, nitric oxide NO is generated from an air source comprising gaseous nitrogen $N_2$ and oxygen $O_2$.

At 804, the nitric oxide NO is combined with the oxygen $O_2$ in a conduit to form nitrogen dioxide $NO_2$.

At 806, the fertilizer is manufactured by injecting the nitrogen dioxide $NO_2$ into a liquid to generate nitric acid $HNO_3$ which combines with the liquid to generate a nitrate radical $NO_3$.

At 808, the manufacturing the fertilizer occurs in situ proximate to an intended area of use such that transportation of the fertilizer from a site of preparation to the area of use is reduced compared to conventional manufacture processes for the fertilizer.

At 810, the nitrate radical $NO_3$ is mixed with the liquid and the mixture is provided for fertilization and watering of a crop.

At 812, an ion of a material is released to combine with the liquid. The material may be copper, iron, or a blend of metals that allow ionization to occur in either a corona discharge cell or a cavity that is exposed to microwaves or other high-energy radio waves.

With reference now to FIG. 9, a flowchart of process 900 for reducing revenue expenditures associated with an in situ production of a fertilizer in accordance with embodiments of the present technology. It should be appreciated that process 900 may be carried out with some or all of the steps described and not necessarily in the in order described. Process 900 may be carried out using the systems and components described in FIGS. 1A-C, 2A-C, 3, 4, and 5. It should be appreciated that the present technology may operate process 900 in a plurality of instances occurring simultaneously, in series, or in parallel. In addition, process 600 may be operated in conjunction with other processes such as processes 600, 700, or 800.

At 902, nitric oxide NO is generated from an air source comprising a gaseous nitrogen $N_2$ and oxygen $O_2$.

At 904, the nitric oxide NO is combined with the oxygen $O_2$ in a conduit to form nitrogen dioxide $NO_2$.

At 906, the fertilizer is manufactured by injecting the nitrogen dioxide $NO_2$ into a liquid to generate nitric acid $HNO_3$ which combines with the liquid to generate a nitrate radical $NO_3$.

At 908, the revenue expenditures associated with the manufacturing the fertilizer are reduced compared to conventional manufacture processes for the fertilizer by reducing energy requirements associated with producing the fertilizer and by reducing transportation of the fertilizer from a site of preparation to an area of use compared to the conventional manufacture processes. It should also be appreciated that the hazards associated with manufacture and transport of conventional nitrogen fertilizers like ammonium nitrate will also be reduced creating a positive revenue effect. It should also be appreciated that the hazards associated with manufacture and transport of conventional nitrogen fertilizers like ammonium nitrate will also be reduced further lowering expenses.

At 910, the nitrate radical $NO_3$ mixed with the liquid are provided for fertilization and watering of a crop.

At 912, an ion of a material is released to combine with the liquid. The material may be copper, iron, or a blend of metals that allow ionization to occur in either a corona discharge cell or a cavity that is exposed to microwaves or other high energy radio waves.

The invention claimed is:

1. A system for creating a nitrate combined with a liquid, comprising:
 a corona discharge cell to generate an electrical field, said corona discharge cell further comprising:
  a conduit to pass air through said electrical field to produce a gas plasma comprising nitric oxide NO, wherein said air comprises a mixture of at least nitrogen $N_2$ and oxygen $O_2$, said conduit for combining said nitric oxide NO with said oxygen $O_2$ to form nitrogen dioxide $NO_2$;
  an injector for combining said nitrogen dioxide $NO_2$ with said liquid to generate nitric acid $HNO_3$ which combines with said liquid to generate said nitrate comprised of nitrate radical $NO_3$ mixed with said liquid;
 an inner portion that is electrically conductive;
  an outer portion that is electrically conductive wherein said outer portion surrounds said inner portion without contacting said inner portion and forms said conduit to pass said air in a substantially tubular shape;
  a power source coupled with said inner portion and said outer portion to produce said electrical field in said conduit;
  an outer conductor substantially tubular in shape and comprising a first length;
  an insulator substantially tubular in shape and surrounded by said outer conductor;
  an inner conductor comprising a second length surrounded by said outer conductor and said insulator, wherein said second length is longer than said first length and wherein said inner conductor comprises a first diameter along said first length and second diameter at an edge of said first length, wherein said first diameter is longer than said second diameter; and
  an air gap between said inner conductor and said insulator, wherein said air gap has a first thickness at said first diameter of said inner conductor and a second thickness at said second diameter of said inner conductor, wherein said air gap forms said conduit to pass said air through said electrical field generated by said outer conductor and said inner conductor.

2. The system of claim 1 wherein said inner portion comprises a material selected from the group of materials consisting of: copper, iron, and a blend of metals that allow ionization to occur in said corona discharge cell.

3. The system of claim 1 wherein said inner portion is substantially cylindrical in shape and said outer portion is substantially tubular in shape.

4. The system of claim 1 wherein said corona discharge cell comprises a control for controlling a feature wherein said feature is selected from the group of features consisting of: a pressure of said corona discharge cell, a frequency of a power supply, a current of a power supply, a temperature, a voltage of a power supply, an alternating current of a power supply, and a direct current of a power supply.

5. The system of claim 1 further comprising:
 a power supply to control said corona discharge cell at a resonant frequency.

6. The system of claim 4 wherein said power supply is to de-tune said corona discharge cell off of said resonant frequency to a predetermined offset after a startup of said corona discharge cell.

7. The system of claim 1 wherein said liquid comprises water $H_2O$.

8. The system of claim 1 wherein said injector is a porous media allowing said nitrogen dioxide $NO_2$ to mix with said liquid.

9. The system of claim 1, said system further comprising:
 a plurality of corona discharge cells, conduits, and injectors connected in series.

10. The system of claim 1, said system further comprising:
 a plurality of corona discharge cells, conduits, and injectors connected in parallel.

11. A system for creating a nitrate combined with a liquid, comprising:
 a corona discharge cell to generate an electrical field, said corona discharge cell further comprising:
  a conduit to pass air through said electrical field to produce a gas plasma comprising nitric oxide NO, wherein said air comprises a mixture of at least nitrogen $N_2$ and oxygen $O_2$, said conduit for combining said nitric oxide NO with said oxygen $O_2$ to form nitrogen dioxide $NO_2$;
  an injector for combining said nitrogen dioxide $NO_2$ with said liquid to generate nitric acid $HNO_3$ which combines with said liquid to generate said nitrate comprised of nitrate radical $NO_3$ mixed with said liquid;
  an inner portion that is electrically conductive;
  an outer portion that is electrically conductive wherein said outer portion surrounds said inner portion without contacting said inner portion and forms said conduit to pass said air in a substantially tubular shape, wherein said inner portion is substantially cylindrical in shape and said outer portion is substantially tubular in shape; and
  a power source coupled with said inner portion and said outer portion to produce said electrical field in said conduit.

12. The system of claim 11 wherein said corona discharge cell further comprises:
 an outer conductor substantially tubular in shape and comprising a first length;

an insulator substantially tubular in shape and surrounded by said outer conductor;

an inner conductor comprising a second length surrounded by said outer conductor and said insulator, wherein said second length is longer than said first length and wherein said inner conductor comprises a first diameter along said first length and second diameter at an edge of said first length, wherein said first diameter is longer than said second diameter; and an air gap between said inner conductor and said insulator, wherein said air gap has a first thickness at said first diameter of said inner conductor and a second thickness at said second diameter of said inner conductor, wherein said air gap forms said conduit to pass said air through said electrical field generated by said outer conductor and said inner conductor.

13. The system of claim 11 wherein said inner portion comprises a material selected from the group of materials consisting of: copper, iron, and a blend of metals that allow ionization to occur in said corona discharge cell.

14. The system of claim 11 wherein said corona discharge cell comprises a control for controlling a feature wherein said feature is selected from the group of features consisting of: a pressure of said corona discharge cell, a frequency of a power supply, a current of a power supply, a temperature, a voltage of a power supply, an alternating current of a power supply, and a direct current of a power supply.

15. The system of claim 11 further comprising:
a power supply to control said corona discharge cell at a resonant frequency.

16. The system of claim 14 wherein said power supply is to de-tune said corona discharge cell off of said resonant frequency to a predetermined offset after a startup of said corona discharge cell.

17. The system of claim 11 wherein said liquid comprises water $H_2O$.

18. The system of claim 11 wherein said injector is a porous media allowing said nitrogen dioxide $NO_2$ to mix with said liquid.

19. The system of claim 11, said system further comprising:
a plurality of corona discharge cells, conduits, and injectors connected in series.

20. The system of claim 11, said system further comprising:
a plurality of corona discharge cells, conduits, and injectors connected in parallel.

* * * * *